United States Patent
Amsbeck

(10) Patent No.: US 10,371,355 B2
(45) Date of Patent: Aug. 6, 2019

(54) PHOSPHOR ELEMENT

(71) Applicant: OSRAM GmbH, Munich (DE)

(72) Inventor: Dirk Amsbeck, Berlin (DE)

(73) Assignee: OSRAM GMBH, Munich (DE)

( * ) Notice: Subject to any disclaimer, the term of this patent is extended or adjusted under 35 U.S.C. 154(b) by 170 days.

(21) Appl. No.: 15/417,268

(22) Filed: Jan. 27, 2017

(65) Prior Publication Data

US 2017/0219185 A1    Aug. 3, 2017

(30) Foreign Application Priority Data

Jan. 28, 2016 (DE) .................. 10 2016 201 308

(51) Int. Cl.
| | |
|---|---|
| *F21V 9/16* | (2006.01) |
| *C09K 11/00* | (2006.01) |
| *F21V 9/30* | (2018.01) |
| *C09K 11/77* | (2006.01) |
| *F21S 43/00* | (2018.01) |
| *F21Y 115/30* | (2016.01) |
| *F21Y 115/10* | (2016.01) |
| *F21W 131/107* | (2006.01) |

(52) U.S. Cl.
CPC ............ *F21V 9/30* (2018.02); *C09K 11/7774* (2013.01); *F21S 43/00* (2018.01); *F21W 2131/107* (2013.01); *F21Y 2115/10* (2016.08); *F21Y 2115/30* (2016.08)

(58) Field of Classification Search
CPC .......... F21V 9/16; F21V 9/30; C09K 11/7774
USPC ......................................................... 362/84
See application file for complete search history.

(56) References Cited

U.S. PATENT DOCUMENTS

| | | |
|---|---|---|
| 2009/0057612 A1 | 3/2009 | Hosoba et al. |
| 2011/0284494 A1 | 11/2011 | Von Malm |
| 2014/0175478 A1 | 6/2014 | Wirth |
| 2015/0014728 A1* | 1/2015 | Do ....................... C09K 11/565 257/98 |
| 2015/0333109 A1 | 11/2015 | Riegel et al. |
| 2016/0109099 A1* | 4/2016 | Okuno ................ H01L 51/5271 362/551 |

FOREIGN PATENT DOCUMENTS

| | | |
|---|---|---|
| DE | 102007053286 A1 | 4/2009 |
| DE | 102010034915 A1 | 2/2012 |
| DE | 102014106952 A1 | 11/2015 |

OTHER PUBLICATIONS

German Search Report based on application No. 10 2016 201 308.4 (7 pages) dated Aug. 10, 2016 (for reference purpose only).

* cited by examiner

*Primary Examiner* — Karabi Guharay
(74) *Attorney, Agent, or Firm* — Viering Jentschura & Partner MBB

(57) ABSTRACT

In various embodiments, a phosphor element is provided. The phosphor element includes a monocrystal composed of a phosphor element material for at least partly converting a pump radiation into a conversion radiation. The monocrystal is formed with a multiplicity of scattering centers incorporated into the monocrystal—Apart from that, however, the phosphor element material in the monocrystal is present in a monocrystalline fashion. The scattering centers for scattering the conversion radiation are incorporated into the monocrystal.

19 Claims, 3 Drawing Sheets

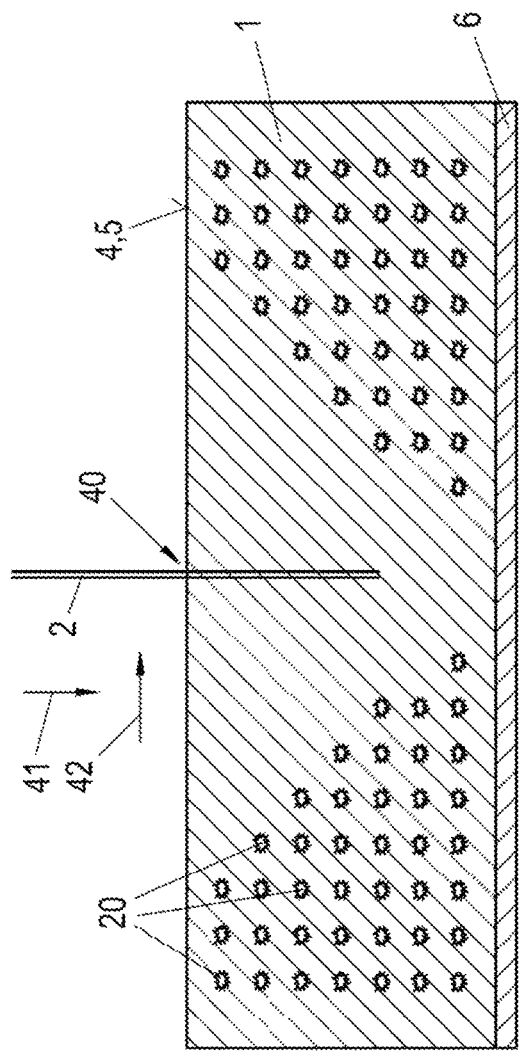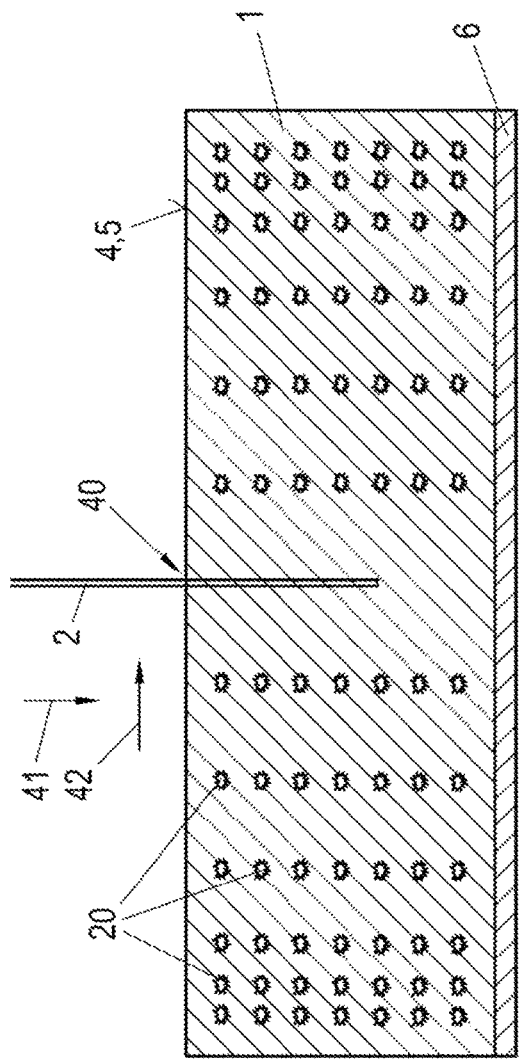

PHOSPHOR ELEMENT

CROSS-REFERENCE TO RELATED APPLICATION

This application claims priority to German Patent Application Serial No. 10 2016 201 308.4, which was filed Jan. 28, 2016, and is incorporated herein by reference in its entirety.

TECHNICAL FIELD

Various embodiments relate generally to a phosphor element for converting a pump radiation into a conversion radiation.

BACKGROUND

A phosphor element of the aforementioned type can be used e.g. with a light emitting diode (LED) or a light emitting laser diode in order to convert the e.g. blue primary light thereof (the pump radiation) into e.g. yellow conversion light (the conversion radiation). The phosphor element emits the conversion radiation in response to the excitation with the pump radiation. In this case, the entire pump radiation need not necessarily be converted in the phosphor element, rather proportionally non-converted pump radiation can also be used together with the conversion radiation in a mixture, that is to say that, in the example just mentioned, non-converted blue primary light and the yellow conversion light in a mixture can then produce e.g. white light.

In this case, the phosphor element is typically constructed from phosphor particles having a customary diameter of not more than 5 µm, if appropriate also somewhat more depending on the field of application, and can be produced e.g. by applying a suspension (matrix material), with the phosphor particles therein and curing said suspension, such that the phosphor particles are then embedded into the matrix material. The phosphor element can be arranged e.g. on the emission area of an LED or on some other suitable substrate. In the case of such a phosphor element, e.g. the thermal properties may be disadvantageous, in particular a low thermal conductivity.

SUMMARY

In various embodiments, a phosphor element is provided. The phosphor element includes a monocrystal composed of a phosphor element material for at least partly converting a pump radiation into a conversion radiation. The monocrystal is formed with a multiplicity of scattering centers incorporated into the monocrystal—Apart from that, however, the phosphor element material in the monocrystal is present in a monocrystalline fashion. The scattering centers for scattering the conversion radiation are incorporated into the monocrystal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 4A and 4B show scattering centers arranged with varying density in a YAG:Ce monocrystal.

DESCRIPTION

Figure 1:
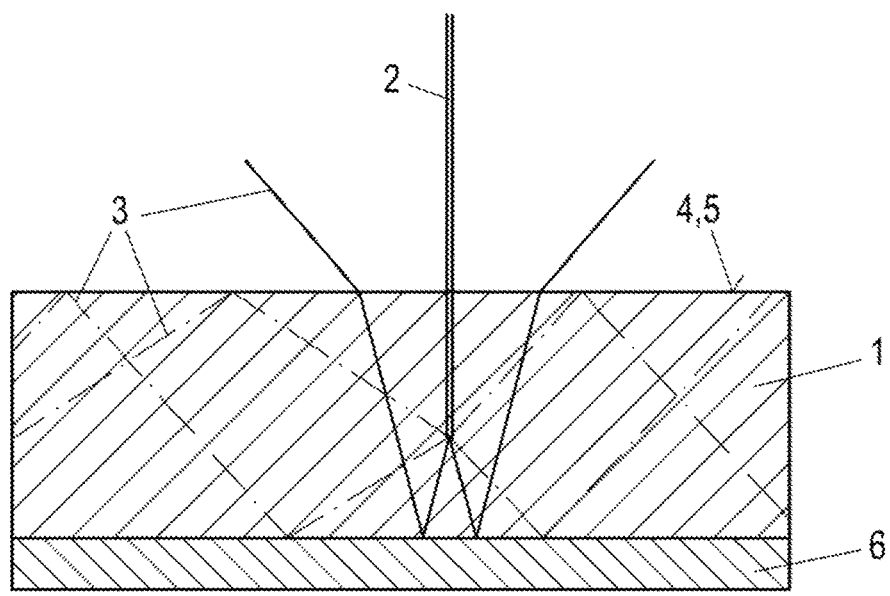
FIG. 1 shows, in schematic illustration, a YAG:Ce monocrystal not according to the embodiments, without scattering centers therein.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments address the technical problem of specifying a particularly advantageous phosphor element.

According to various embodiments, this problem is solved by a phosphor element including a monocrystal composed of a phosphor element material for converting a pump radiation into a conversion radiation. The monocrystal is formed with a multiplicity of scattering centers incorporated into the monocrystal, that is to say is formed as a volume scatterer. Apart from that, however, the phosphor element material in the monocrystal is present in a monocrystalline fashion. The scattering centers for scattering the conversion radiation are incorporated into the monocrystal.

Various embodiments are found in the dependent claims and the entire disclosure, a specific distinction between device and method or use aspects not always being drawn in the presentation; at any rate the disclosure should be interpreted implicitly with regard to all claim categories.

Various embodiments provide a monocrystal of the phosphor element material, but incorporate scattering centers into said monocrystal and thus embodying the latter as a volume scatterer. On the one hand, effects of the monocrystallinity can thus be manifested; specifically, e.g. the quantum efficiency of a monocrystal falls only slightly at elevated temperatures, e.g. above 150° C., whereas it falls greatly in the case of the same phosphor material in polycrystalline form/particle form; cf. FIG. 3 for illustration. In this regard, the operating temperature of the phosphor element can be raised without significant losses in quantum efficiency. Moreover, the monocrystal can afford effects e.g. with regard to its thermal conductivity as well. Furthermore, monocrystalline phosphor materials are distinguished by the fact that, for the same converted power, the temperature of the phosphor, on account of the higher thermal conductivity, turns out to be lower than in the case of polycrystalline phosphor materials.

The inventor has ascertained on the other hand, however, that the coupling out of the conversion radiation generated in the monocrystal can be problematic; in this regard, e.g. a spot widening can occur, that is to say an enlargement of the region from which the conversion radiation is emitted at an emission area. This may be disadvantageous for instance in applications which require a high luminance. In a simplified explanation, although (at elevated temperature) more conversion radiation is generated, it can be coupled out more poorly. This may be caused e.g. by interface effects, too, such that, for instance upon the transition from the monocrystal to air, back-reflections occur, e.g. total internal reflection or else Fresnel reflections. Figuratively speaking, the conversion radiation is emitted omnidirectionally within the monocrystal, but only a cone thereof can emerge toward the front from the transition to air at an emission area because radiation impinging on the emission area excessively shallowly is subjected to total internal reflection, and is thus reflected away toward the side.

By the incorporated scattering centers, now at least part of the conversion radiation propagating toward the side at an angle with respect to the emission area that is too shallow for coupling out can be scattered toward the front and thus indeed be coupled out. Furthermore, e.g. conversion radiation which, at the emission area, is originally not coupled out, but rather reflected back, can also be scattered and thus guided (in a statistically distributed manner) once again in the direction of the emission area. Overall, the embedded scattering centers at any rate help to increase the proportion of coupled-out conversion radiation.

To summarize, by the monocrystal, firstly the temperature characteristic can be improved, that is to say that e.g. at elevated temperature more conversion radiation can be generated and/or the heat dissipation can be optimized; secondly, the configuration as volume scatterer (improved coupling out) then makes this actually usable as well, that is to say that an increased efficiency arises in the overall consideration.

A "multiplicity" of scattering centers are incorporated into the monocrystal, e.g. at least 100, 1000, 5000, 10 000, 20 000, 30 000, 40 000 or 50 000 scattering centers; possible upper limits may be (independently thereof) e.g. at most $5 \cdot 10^6$, $1 \cdot 10^6$ or 500 000 scattering centers. The scattering centers "for scattering the conversion radiation" are incorporated into the monocrystal, that is to say are intended in this respect to be optically effective and to have a corresponding minimum size.

In a configuration, each of the scattering centers has a volume of in each case at least 1 $\mu m^3$, with increasing preference in the order mentioned at least 5 $\mu m^3$, 10 $\mu m^3$, 15 $\mu m^3$, 20 $\mu m^3$, 25 $\mu m^3$ or 30 $\mu m^3$; possible upper limits may be (independently thereof) e.g. at most 30 000 $\mu m^3$, 20 000 $\mu m^3$, 10 000 $\mu m^3$, 1000 $\mu m^3$, 500 $\mu m^3$, 300 $\mu m^3$, 200 $\mu m^3$ or 100 $\mu m^3$ (with increasing preference in the order mentioned). It generally holds true in the context of this disclosure that 1 $\mu m^3 = 1 \cdot 10^{-18}$ $m^3$ and 1 $mm^3 = 1 \cdot 10^{-9}$ $m^3$.

In general, it is not necessary for every one of the scattering centers present overall in the monocrystal to have a corresponding minimum size, rather the intention is for there to be simply at least a "multiplicity" having a corresponding minimum size and there may furthermore also be even smaller scattering centers; for example, all the scattering centers in the monocrystal have a corresponding minimum size.

The configuration as "volume scatterer" means that the scattering centers are arranged in a distributed manner within the monocrystal, in a volume enclosed by the outer surfaces thereof. For the conversion radiation at any rate, the scattering at the scattering centers preferably takes place passively, that is to say without a change of wavelength. In the context of this disclosure, "scattering" very generally means the change of the direction of propagation of a beam of the conversion radiation (or else of the pump radiation) on account of an interaction with a respective scattering center. This change of direction may e.g. also be caused by refraction effects, for instance upon the transition between materials of different constitutions.

Generally, the conversion may be a down conversion, that is to say that the pump radiation is converted into conversion radiation having a longer wavelength. The conversion radiation, which can also be referred to as conversion light, has at least portions in the visible spectral range (380 nm to 780 nm); e.g. the majority of the radiation power thereof, e.g. at least 60%, 70%, 80% or 90%, lies in the visible spectral range, e.g. the conversion radiation in its entirety. The pump radiation can e.g. also be UV radiation; blue light may be used, however, which then, in the case of only partial conversion, may be used proportionally in a mixture (which can be promoted by the scattering centers) with the conversion radiation.

In a configuration, the monocrystal with the incorporated scattering centers occupies a volume of at least $1 \cdot 10^{-3}$ $mm^3$, with increasing effect in the order mentioned at least $5 \cdot 10^{-3}$ $mm^3$, $1 \cdot 10^{-2}$ $mm^3$, $2.5 \cdot 10^{-2}$ $mm^3$, $5 \cdot 10^{-2}$ $mm^3$, $7.5 \cdot 10^{-2}$ $mm^3$, $1 \cdot 10^{-1}$ $mm^3$, $2.5 \cdot 10^{-1}$ $mm^3$ or $5 \cdot 10^{-1}$ $mm^3$; possible upper limits may be (independently thereof) e.g. at most 100 $mm^3$, 50 $mm^3$, 10 $mm^3$ or 5 $mm^3$. The volume occupied by the monocrystal is taken between the outer surfaces thereof, that is to say that the scattering centers are also included. A macroscopic monocrystal may thus be provided.

In general, however, a submacroscopic monocrystal is also conceivable, for instance having a volume of—with increasing effect in the order mentioned—at least $5 \cdot 10^{-6}$ $mm^3$, $7.5 \cdot 10^{-6}$ $mm^3$, $1 \cdot 10^{-5}$ $mm^3$, $2.5 \cdot 10^{-5}$ $mm^3$ $5 \cdot 10^{-5}$ $mm^3$, $7.5 \cdot 10^{-5}$ $mm^3$ or $1 \cdot 10^{-4}$ $mm^3$; possible upper limits may be (independently thereof) e.g. at most $1 \cdot 10^{-3}$ $mm^3$, $5 \cdot 10^{-4}$ $mm^3$ or $1 \cdot 10^{-4}$ $mm^3$. Such a submacroscopic monocrystal can then be combined in the phosphor element e.g. with further monocrystals of the phosphor element material, which can either directly adjoin one another as grains or else, in the case of a two-phase ceramic, be embedded into a second phase as matrix. Since the monocrystal is comparatively large in the case of this "submacroscopic" variant, too, the above-described advantages (thermal conductivity and/or quantum efficiency) can nevertheless be manifested and, secondly, the embedded scattering centers can help to improve the coupling out. A macroscopic monocrystal may nevertheless be provided; for example, the entire phosphor element material of the phosphor element is monocrystalline, at least apart from the scattering centers.

In various embodiments, each of the scattering centers forms a discrete volume in the monocrystal, that is to say that the scattering centers are not directly connected, rather phosphor element material in monocrystalline form is always present in each case between two scattering centers. Each of the multiplicity of scattering centers incorporated into the monocrystal is per se completely surrounded by monocrystalline phosphor element material.

In a configuration, the discrete volumes are distributed uniformly over the monocrystal. This means that, in the case of an (imaginary) complete subdivision of the monocrystal into equally sized, uniform and mutually disjoint subvolumes, the number of scattering centers (that is to say of discrete volumes) in each of the subvolumes is normally distributed around a mean value (where $\mu=0$ and $\sigma^2=1$). In this case, the subvolumes must not be chosen to be smaller than a minimum size, such that at least 10, e.g. at least 20, e.g. at least 30, of the scattering centers (discrete volumes) are arranged in each of the subvolumes; possible upper limits may be e.g. at most 1000, 500 or 100 scattering centers. The "subvolumes" are the subject of the imaginary decomposition for the assessment of "uniformity", whereas "volumes" relates to the scattering centers.

In a configuration, the discrete volumes are arranged in the monocrystal in the form of a regular point lattice, that is to say in the form of a Bravais lattice. In this regard, the scattering centers (the discrete volumes) can be arranged in a basic cell of the Bravais lattice e.g. at the corners of a cube (primitive cubic), at the corners of a cube and additionally at the center thereof (body centered cubic) or at the corners of a cube and additionally centrally on each of its side faces (face centered cubic), or precisely in a manner corresponding to another of the Bravais lattices in three-dimensional space.

In various embodiments, the discrete volumes are arranged in the monocrystal in such a way that, when looking perpendicularly at an incidence area of the phosphor element, the scattering increases around an incidence region of the incidence area outward, that is to say in the lateral directions (the lateral directions are perpendicular to a surface normal to the preferably planar incidence area). The increasing scattering is achieved by a correspondingly increasing density of the scattering centers. By virtue of the fact that the scattering is lower in the incidence region compared with outwardly around the latter, a scattering of the pump radiation is reduced or avoided.

For the density of the scattering centers that increases outward in the lateral (radial) directions around the incidence region, said scattering centers can be distributed uniformly e.g. along a depth direction (which is opposite to the surface normal), but in a manner graduated with increasing density in the lateral directions perpendicular thereto, cf. FIG. 4A for illustration. On the other hand, however, the scattering centers can also be distributed with constant density with respect to the lateral directions in each case in a plane perpendicular to the depth direction, but for each plane here a region of different size (decreasing along the depth direction) around the incidence region can be free of scattering centers, cf. FIG. 4B for illustration. In various embodiments, a conical region remains free of scattering centers. It goes without saying that mixed forms of "lateral graduation" and "depth graduation" are also possible.

In various embodiments, the phosphor element material is Ce-doped yttrium aluminum garnet (YAG:Ce). In general, however, as phosphor element material, it is also possible to provide doped lutetium aluminum garnet (LuAG), e.g. Ce-doped lutetium aluminum garnet (LuAG), or it is possible to provide doped silicon nitride materials, e.g. Eu-doped $CaAlSiN_3$. Doping materials can generally be e.g. Ce, Tb, Eu, Yb, Pr, Tm and/or Sm. Furthermore, additional dopings are also possible, that is to say codopings, for instance YAG material doped with Gd or Lu and codoped with at least one of the codopants Ce, Tb, Eu, Yb, Pr, Tm and/or Sm.

In a configuration, the scattering centers are defect sites in the—apart therefrom—monocrystalline phosphor element material, that is to say that e.g. phosphor element material is at least partly present in the scattering centers, too, but not in a form corresponding to the monocrystal, but rather e.g. in amorphous form. In a defect site, the phosphor material can also be locally cracked/ruptured.

In a configuration, the defect sites are melted portions of the phosphor element material, that is to say that the scattering centers in the monocrystal are thermally induced or produced by local ionization, preferably using a pulsed laser beam (see below in detail). In other words, e.g. a phosphor element material that is previously monocrystalline in its entirety is locally modified in its interior at a multiplicity of sites and the scattering centers are thus produced.

Various embodiments also relate to an irradiation device, e.g. a lighting device, wherein a phosphor element disclosed in the present case is combined with a pump radiation source for emitting the pump radiation. Both are arranged relative to one another here in such a way that during operation at any rate part of the emitted pump radiation is incident on the phosphor element. For reasons of efficiency it may be provided for the entire pump radiation to impinge on the phosphor element, but owing to arrangement dictates there may e.g. also be upper limits of 99%, 97% or 95%; e.g., at least 60%, 70% or 80% of the pump radiation emitted by the pump radiation source is incident on the phosphor element (the percentage indications are based on the radiation power).

In various embodiments, a laser, e.g. a semiconductor laser, is provided as the pump radiation source and the phosphor element is arranged at a distance therefrom (so-called remote phosphor concepts, in combination with laser excitation sources also known by the name LARP or Laser Activated Remote Phosphor). Upstream of the phosphor element, the pump radiation then optically effectively permeates a gas volume, preferably air. "Optically effectively" means that refractions then occur upon the transition between gas volume/phosphor element. In various embodiments, an optical unit is provided between laser and phosphor element, e.g. a lens that collimates the pump radiation (collimation lens), and/or a lens that focuses the pump radiation onto the incidence area of the phosphor element. In this case, "lens" may be interpretable both in respect of an individual lens and in respect of a system of a plurality of individual lenses.

Light sources having a high luminance can be realized with the combination of laser source and phosphor element arranged at a distance therefrom; with the increase in the operating temperature which is made possible by the phosphor element according to the invention (see above), more pump radiation can be introduced into the phosphor element which can help to increase the luminance or the luminous flux overall. Furthermore, the phosphor element in accordance with various embodiments can be subjected to higher pump power with the same cooling, since the better thermal conductivity ensures that the phosphor generally remains cooler.

In various embodiments, a light emitting diode (LED), generally also on an organic basis (OLED), e.g. on an inorganic basis, is provided as the pump radiation source. In various embodiments, the phosphor element is then provided in direct optical contact with an emission area of the LED, that is to say that therebetween the pump radiation does not permeate an optically effective gas volume influencing the beam path, in particular an air volume. The phosphor element can thus be fixed to the emission area e.g. by a joining connection layer; the phosphor element can in particular also be part of a housing of the LED ("LED" means the LED chip in the present case), that is to say enclose the latter e.g. jointly with a filling material (e.g. molding compound or silicone) and/or a mounting body (leadframe).

The combination with a phosphor element according to various embodiments may be efficient e.g. insofar as the operating temperature of the LED can thus be increased (the properties of the phosphor element are generally limiting; the other components can usually also be operated at higher temperatures). The LED can then be operated with a higher current density e.g. with an unchanged thermal linking in comparison with the conventional LED, as a result of which the luminous efficiency can be improved. In addition or alternatively, e.g. the cooling concept can also be simplified, that is to say that e.g. a construction without a separate heat sink can be realized.

Generally, in the case of an irradiation device described in the present case, or a corresponding phosphor element, an incidence area and/or an emission area of the phosphor element can be dichroically coated. By way of example, the surface constitution can also be modified, e.g. roughened, in order to increase the coupling efficiency.

Various embodiments also relate to a method for producing a phosphor element described in the present case with defect sites/melted portions as scattering centers, or an irradiation device including such a phosphor element. The defect sites are introduced using one or more laser beams focused within the monocrystal. At the focus of the laser beam, the spatial and temporal energy density is then so high that the crystal lattice is locally modified, the phosphor element material is melted e.g. locally or is locally altered in terms of its crystal structure or its local density, or locally additional zero-, one- or multidimensional lattice defects are incorporated (e.g. vacancies, dislocations, grain boundaries, microcracks).

The difference with respect to the above-described irradiation of the monocrystal during operation for conversion purposes (cf. the paragraphs above) resides e.g. in the focusing within, which then produces the high energy density. Since the laser beam is focused within the monocrystal, at the outer surfaces of said monocrystal said laser beam is not yet overly small in its spot diameter, that is to say that ideally no damage occurs there.

In a configuration, the laser beam acts on the monocrystal in a pulsed manner. This may concern in particular the production of a phosphor element including scattering centers embodied as discrete volumes. The laser beam then at any rate does not act on the monocrystal during "displacement" between two scattering centers (which can e.g. also take place as a result of the tilting of a deflection mirror); by way of example, each scattering center is generated by exactly one pulse. The pulsing can generally e.g. also be carried out by a shutter; by way of example, however, the laser that emits the laser beam is operated with pulsed output power. Furthermore, mode-locked ultra-short pulsed lasers can also be used.

In a configuration, the pulsed action is effected with a repetition frequency of at least 500 Hz, e.g. at least 750 Hz, e.g. at least 1 kHz; possible upper limits may be e.g. at most 30 kHz, with increasing effect in the order mentioned at most 20 kHz, 15 kHz, 10 kHz or 8 kHz. In this case, generally an upper limit may also be of interest independently of a lower limit, and vice versa, and the values are also intended to be correspondingly disclosed. The pulse length will preferably not be greater than 100 µs, wherein possible lower limits (independently thereof) may be e.g. at least 10 fs or 100 fs, or else at least 1 ps, 10 ps or 100 ps.

In a configuration, an Nd:YAG laser is provided for introducing the scattering centers, which laser emits the laser beam that is then focused in the monocrystal. Generally, for the focusing of the laser beam during the production of the phosphor element, e.g. a focusing optical unit having a variable focal length is arranged between the laser and the monocrystal, e.g. a flat field optical unit or an f-theta lens system. The exemplary Nd:YAG laser can emit a laser beam having a wavelength of e.g. 1064 nm or, with frequency doubling, of 532 nm (a wavelength that deviates from the excitation wavelength of the pump radiation may be advantageous).

Other YAG-based laser systems can also be used, e.g. Cr-, Yb-, Ho-, Tm- or Er-YAG laser systems. In principle, however, all laser systems can be used which can supply a sufficient pulse energy, e.g. in a wavelength range in which the monocrystal absorbs as little as possible. The pulse energy is intended to be e.g. at least 100 J/cm$^2$. A possible upper limit (independently thereof) may be e.g. 3 kJ/cm$^2$; e.g. around 1.4 kJ/cm$^2$ may be provided.

In a configuration, when introducing the defect sites, the laser beam is focused at a variable depth within the monocrystal, that is to say that focal points which are offset in the depth direction are generated, specifically in addition to a lateral offset.

Various fields of application of the irradiation device or of a corresponding phosphor element may be e.g. in the area of motor vehicle lighting, e.g. motor vehicle exterior lighting, for instance illumination of the road by a front headlight, e.g. also in a variable manner, that is to say for instance in a masked manner depending on oncoming traffic. Further fields of application may be in the area of effect lighting; on the other hand, however, the irradiation device can also serve for operating area lighting. The irradiation device can furthermore be used as a light source of a projection apparatus (for data/film projection), endoscope or else stage spotlight, for instance for scene lighting in the domain of film, television and/or theater. Generally, a use in an industrial environment is also possible, but also in the area of building or architectural lighting, e.g. exterior lighting.

FIG. 1 shows a monocrystal 1 composed of cerium-doped yttrium aluminum garnet (YAG:Ce). During operation, said monocrystal is irradiated with a pump radiation 2, namely blue pump light in the present case; the pump radiation 2 is converted into conversion radiation 3 in the monocrystal 1, in the present case into yellow conversion light. The conversion radiation 3 is emitted omnidirectionally within the monocrystal 1; the propagation paths of some beams are illustrated by way of example.

The phosphor element including the monocrystal 1 is operated in reflection, that is to say that a pump radiation incidence area 4 and a conversion radiation emission area 5 coincide. The opposite, lower side surface in FIG. 1 is reflectively coated with a mirror 6 in order that the conversion radiation 3 emitted proportionally downward is nevertheless guided to the conversion radiation emission area 5.

Since the YAG:Ce monocrystal has a significantly higher refractive index than air (at a wavelength of 589 nm, said refractive index may be approximately n≈1.8, in contrast to n≈1 for air), at the pump radiation emission area 5 only comparatively steeply impinging beams emerge and beams impinging at a shallower angle are subjected to total internal reflection toward the side and they are thus not usable (at any rate not at the conversion radiation emission area 5). In the case of the "steeply" impinging beams, the angle between beam direction and surface normal (which points into the monocrystal 1) is small, whereas in the case of the "shallowly" impinging beams (illustrated in a dash-dotted manner), said angle is large, indeed larger than the critical angle of total reflection ($\theta_c$).

Figure 2:
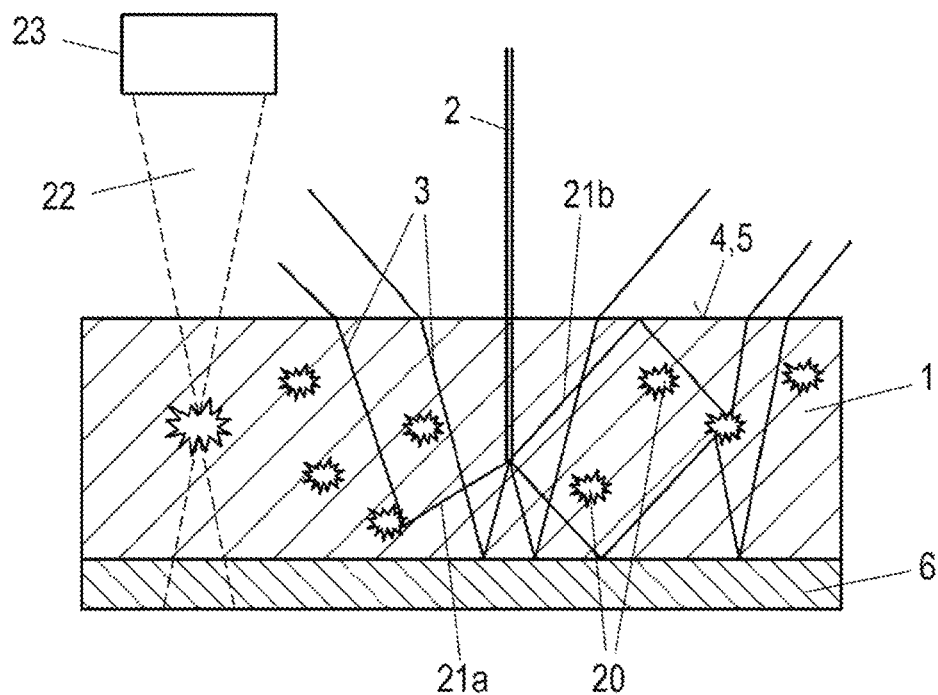
FIG. 2 shows, in schematic illustration, a YAG:Ce monocrystal according to various embodiments with scattering centers therein and the introduction thereof using a laser beam.

In the case of the monocrystal 1 of the phosphor element according to the invention in accordance with FIG. 2, scattering centers 20, specifically defect sites or melted portions, are incorporated into the monocrystal 1. Their mode of operation is illustrated in the right-hand half in FIG. 2, and their introduction is illustrated in the left-hand half (in this respect, see below in detail). If a beam of the conversion radiation 3 impinges on one of the scattering centers 20, it changes its direction and accordingly is incident on the conversion radiation emission area 5 more steeply with certain probability. In this regard, e.g. the first beam 21a would have impinged on the lower side surface shallowly, and after a reflection there would have impinged on the conversion radiation emission area 5 correspondingly shallowly, such that it would not have emerged there, but rather would have been subject to total internal reflection (see FIG. 1 for comparison). As a result of the scattering, by contrast, it is guided more steeply onto the conversion radiation emission area 5 and emerges there.

The second beam 21b illustrates how part of the radiation originally reflected back at the conversion radiation emission area 5 receives a "second chance", namely is scattered after the back-reflection and then impinges more steeply on the conversion radiation emission area 5 and emerges there. To summarize, with the scattering centers 20 incorporated into the monocrystal 1 according to various embodiments, it is possible to increase the coupling out of the conversion radiation (if appropriate also of proportionally non-converted pump radiation in the case of a partial conversion).

The introduction of the scattering centers 20 is illustrated schematically in the left-hand half of FIG. 2; this is carried out using a laser beam 22 focused within the monocrystal 1, said laser beam being emitted by a laser 23, namely an Nd:YAG laser, and being focused by an optical unit (not illustrated) within the monocrystal 1. The laser 23 is operated in a pulsed manner; at a respective focal point, the energy density is then so high that a defect site or melted material portion and thus one of the scattering centers 20 arises.

Figure 3:
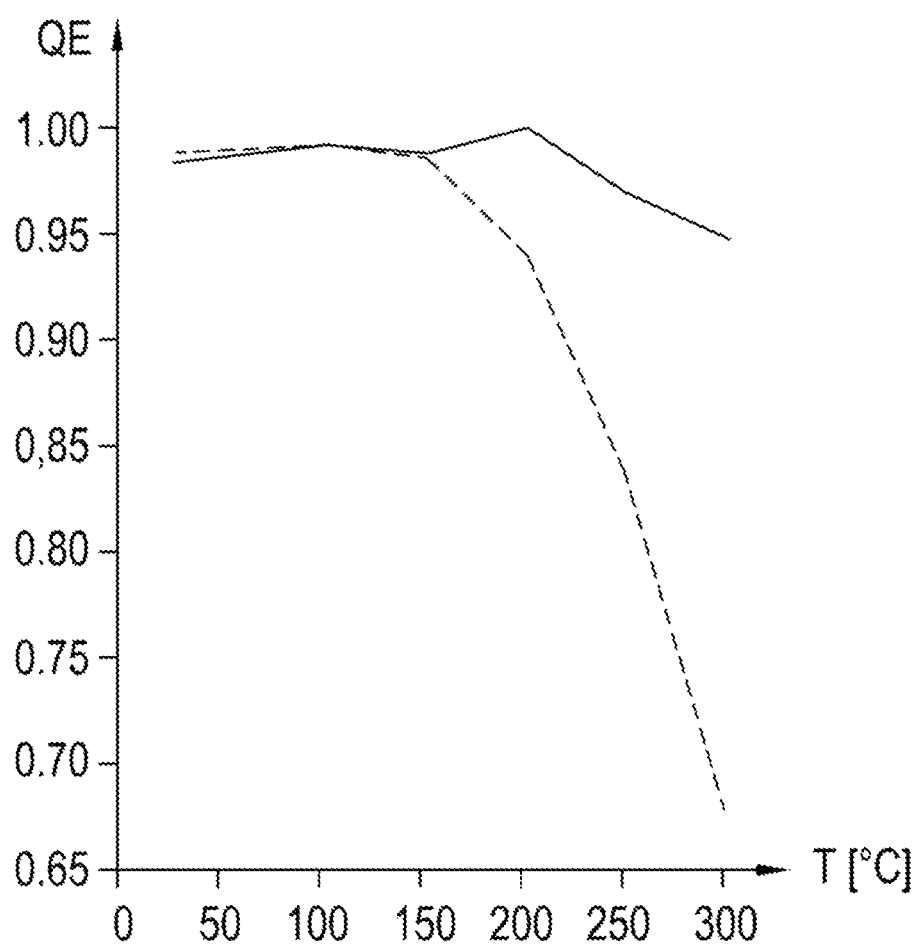
FIG. 3 shows a comparison of the internal quantum efficiency for a pulverulent and a monocrystalline YAG:Ce phosphor.

FIG. 3 illustrates the effect that can arise in the case of monocrystalline YAG:Ce in comparison with conventional YAG:Ce. In this respect, the internal quantum efficiency (QE) as a unitless quantity is plotted against the operating temperature of the YAG:Ce in monocrystalline form (solid line) and in conventional powder form (dashed line). It is evident here that at elevated temperatures above 150° C. the quantum efficiency of the pulverulent YAG:Ce falls significantly, whereas in the case of the monocrystal although said quantum efficiency exhibits a small variation, it remains comparatively high overall. To summarize, YAG:Ce in monocrystalline form can be operated at higher operating temperatures than in conventional powder form, without the quantum efficiency decreasing appreciably as a result.

FIG. 4A,b in each case show a monocrystal 1 in which the scattering centers 20 are arranged with varying density. Looking perpendicularly at the incidence area 4, the density of the scattering centers 20 increases around an incidence region 40, in which the pump radiation 2 is incident on the incidence area 4, outward. By virtue of the fact that the scattering is lower in the incidence region 40 compared with outwardly around the latter, a scattering of the pump radiation 2 is largely avoided.

In the case of the embodiment in accordance with FIG. 4A, the scattering centers 20 are distributed uniformly along a depth direction 41, but are graduated with increasing density in the lateral directions 42 perpendicular thereto. In the case of FIG. 4B, by contrast, the scattering centers 20 are distributed with constant density in each case in the lateral directions 42; however, a conical region is free of scattering centers 20.

LIST OF REFERENCE SIGNS

Monocrystal 1
Pump radiation 2
Conversion radiation 3
Pump radiation incidence area 4
Conversion radiation emission area 5
Mirror 6
Scattering centers 20
First beam 21a
Second beam 21b
Laser beam 22
Laser 23
Incidence region 40
Depth direction 41
Lateral directions 42

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A phosphor element, comprising:
a monocrystal composed of a phosphor element material for at least partly converting a pump radiation into a conversion radiation;
wherein the monocrystal is formed with a multiplicity of scattering centers incorporated into the monocrystal;
wherein the phosphor element material in the monocrystal is present in a monocrystalline fashion;
wherein the scattering centers for scattering the conversion radiation are incorporated into the monocrystal;
wherein the scattering centers are arranged in the monocrystal in such a way that when looking perpendicularly at an incidence area of the monocrystal, the scattering increases around an incidence region of the incidence area outward.

2. The phosphor element of claim 1,
wherein each of the scattering centers occupies a volume of at least 1 µm$^3$.

3. The phosphor element of claim 1,
wherein the monocrystal with the incorporated scattering centers occupies a volume of at least $1 \cdot 10^{-3}$ mm$^3$.

4. The phosphor element of claim 1,
wherein each of the scattering centers forms a discrete volume in the monocrystal.

5. The phosphor element of claim 4,
wherein the discrete volumes are distributed uniformly over the monocrystal.

6. The phosphor element of claim 1,
wherein the phosphor element material is cerium-doped yttrium aluminum garnet.

7. The phosphor element of claim 1,
wherein the scattering centers are defect sites in the monocrystalline phosphor element material.

8. The phosphor element of claim 7,
wherein the defect sites are melted portions of the phosphor element material.

9. An irradiation device, comprising:
a phosphor element, comprising:
  a monocrystal composed of a phosphor element material for at least partly converting a pump radiation into a conversion radiation;
  wherein the monocrystal is formed with a multiplicity of scattering centers incorporated into the monocrystal;
  wherein the phosphor element material in the monocrystal is present in a monocrystalline fashion;
  wherein the scattering centers for scattering the conversion radiation are incorporated into the monocrystal; wherein the scattering centers are arranged in the monocrystal in such a way that when looking perpendicularly at an incidence area of the monocrystal, the scattering increases around an incidence region of the incidence area outward; and
a pump radiation source configured to emit the pump radiation, which are arranged relative to one another such that the phosphor element is irradiated during operation.

10. The irradiation device of claim 9,
wherein the pump radiation source is a laser, the phosphor element being arranged at a distance from said laser in such a way that the pump radiation between the laser and the phosphor element optically effectively permeates a gas volume.

11. The irradiation device of claim 10,
wherein the gas volume is air.

12. The irradiation device as claimed in claim 9,
wherein the pump radiation source is a light emitting diode having an emission area for emitting the pump radiation,
wherein the phosphor element is provided in direct optical contact with the emission area.

13. A method for producing a phosphor element,
the phosphor element comprising:
  a monocrystal composed of a phosphor element material for at least partly converting a pump radiation into a conversion radiation;
  wherein the monocrystal is formed with a multiplicity of scattering centers incorporated into the monocrystal;
  wherein the phosphor element material in the monocrystal is present in a monocrystalline fashion;
  wherein the scattering centers for scattering the conversion radiation are incorporated into the monocrystal;
the method comprising:
  providing a laser beam; and
  introducing the defect sites using the laser beam that is focused within the monocrystal.

14. The method of claim 13,
wherein the laser beam acts on the monocrystal in a pulsed manner.

15. The method of claim 14,
wherein the pulsed action is effected with a repetition frequency of at least 500 Hz and at most 30 kHz.

16. The method of claim 13,
wherein, when introducing the defect sites, the laser beam is focused at a variable depth within the monocrystal, that is to say that focal points which are offset in a depth direction are generated, and in addition laterally offset focal points are generated.

17. A method for producing an irradiation device,
the irradiation device comprising:
  a phosphor element, comprising:
    a monocrystal composed of a phosphor element material for at least partly converting a pump radiation into a conversion radiation;
    wherein the monocrystal is formed with a multiplicity of scattering centers incorporated into the monocrystal;
    wherein the phosphor element material in the monocrystal is present in a monocrystalline fashion;
    wherein the scattering centers for scattering the conversion radiation are incorporated into the monocrystal; and
  a pump radiation source configured to emit the pump radiation, which are arranged relative to one another such that the phosphor element is irradiated during operation;
the method comprising:
  providing a laser beam; and
  introducing the defect sites using the laser beam that is focused within the monocrystal.

18. The method of claim 17,
wherein the laser beam acts on the monocrystal in a pulsed manner.

19. The method of claim 18,
wherein the pulsed action is effected with a repetition frequency of at least 500 Hz and at most 30 kHz.

* * * * *